United States Patent
Ohtsu

(10) Patent No.: US 6,657,995 B1
(45) Date of Patent: Dec. 2, 2003

(54) CIRCUIT CONNECTING UNIT IN INTEGRATED NETWORK

(75) Inventor: Kazuyuki Ohtsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/124,647

(22) Filed: Jul. 29, 1998

(30) Foreign Application Priority Data

Mar. 19, 1998 (JP) ............................................. 10-070934

(51) Int. Cl.$^7$ .......................... H04L 12/66; H04L 12/28; H04M 11/00; H04M 1/64
(52) U.S. Cl. ..................... 370/353; 370/401; 370/354; 370/392; 379/88.17; 379/93.09
(58) Field of Search ................................. 370/353, 354, 370/355, 352, 359, 465–467, 396, 338, 389, 392, 419, 493, 494, 495; 379/93.01, 93.09, 93.11, 93.05

(56) References Cited

U.S. PATENT DOCUMENTS

| | | | | |
|---|---|---|---|---|
| 5,737,395 A | * | 4/1998 | Irribarren | 379/88 |
| 5,828,666 A | * | 10/1998 | Focsaneanu et al. | 370/389 |
| 5,862,134 A | * | 1/1999 | Deng | 370/352 |
| 6,125,174 A | * | 9/2000 | Watanabe | 379/142 |
| 6,128,293 A | * | 10/2000 | Pfeffer | 370/359 |
| 6,134,235 A | * | 10/2000 | Goldman et al. | 370/352 |
| 6,141,345 A | * | 10/2000 | Goeddel et al. | 370/352 |
| 6,163,536 A | * | 12/2000 | Dunn et al. | 370/352 |
| 6,195,357 B1 | * | 2/2001 | Polcyn | 370/401 |
| 6,222,829 B1 | * | 4/2001 | Karlsson et al. | 370/329 |
| 6,295,293 B1 | * | 9/2001 | Tonnby et al. | 370/389 |

FOREIGN PATENT DOCUMENTS

JP     6121051     4/1994

* cited by examiner

Primary Examiner—Hassan Kizou
Assistant Examiner—Hanh Nguyen
(74) Attorney, Agent, or Firm—Katten Muchin Zavis Rosenman

(57) ABSTRACT

In order for a telephone (a public transmission circuit terminal) carrying out voice communication with a terminal with an IT function to simultaneously enjoy an application service function on an LAN, a speech data interface for interfacing speech data between the telephone and a speech unit of a LAN terminal is provided, and a correlation table for correlating the telephone with the data terminal is provided. Further, a non-speech data interface for interfacing non-speech data between the data terminal and the LAN terminal. In case data from the LAN terminal is speech data, the speech data is transmitted via the speech data interface to the telephone. In case data from the LAN terminal is non-speech data, the non-speech data is transmitted via the non-speech data interface to the data terminal.

5 Claims, 3 Drawing Sheets

FIG. 3

| TELEPHONE NUMBER | ASSOCIATED TERMINAL SERVICE | ASSOCIATED DATA TERMINAL TELEPHONE NUMBER | CONNECTING APPLICATION |
|---|---|---|---|
| ⋮ | ⋮ | ⋮ | ⋮ |
| 2 0 0 0 | YES | 4 0 0 0 | CHAT APPLICATION |
| 2 0 0 1 | NO | – | – |
| 2 0 0 2 | YES | 4 0 0 2 | WORD PROCESSOR |
|  |  | 4 0 0 3 | CHAT APPLICATION |
|  |  | 4 0 0 4 | FILE TRANSFER |
| ⋮ | ⋮ | ⋮ | ⋮ |

FIG. 4

| SPECIAL NUMBER | SERVICE ASSOCIATED WITH SPECIAL NUMBER |
|---|---|
| ⋮ | ⋮ |
| 0 # | ASSOCIATED DATA TERMINAL CONNECTING SERVICE DURING SPEECH COMMUNICATION |
| ⋮ | ⋮ |

CIRCUIT CONNECTING UNIT IN INTEGRATED NETWORK

BACKGROUND OF THE INVENTION

1. Field of the Invention

The present invention relates to a technique effective when applied to a communication system in an integrated network such as between a LAN and a telephone switching network.

2. Description of the Related Art

Recently, internet phone which is a LAN terminal provided with a voice communication function (hereinafter referred to as IT (internet phone) function) has begun to prevail. Control of intercommunication between such an internet phone and a telephone in a conventional switched circuit network is standardized by the gateway function provided for by ITU Recommendation H.323 protocol.

Such a terminal with an IT function connected with above-described LAN can carry out data communication of a plurality of applications as well as voice communication. More specifically, as far as the communication is between terminals with an IT function connected with a LAN, not only voice communication but also sharing an image of a word processor on a display and the like can be carried out. Such sharing of an image between terminals with an IT function can be materialized according to the recommendation with regard to data system/image system information transmission and reception provided for by ITU Recommendation H.323.

Conventionally, though advanced communication including data and voice communication can be carried out between terminals with an IT function on an LAN, when a terminal with an IT function communicates with a telephone connected with a common public transmission circuit network, the communication is limited to voice communication.

Therefore, even if a speaker on the side of a telephone owns a computer terminal capable of data communication, the speaker cannot enjoy functions of, for example, sharing image data between the computer terminal and a terminal with an IT function.

SUMMARY OF THE INVENTION

The present invention is made in view of the above, and an object of the present invention is to provide a technique which allows the enjoyment of an application service function on a LAN when a speaker on the side of a telephone carries out voice communication with a terminal with an IT function using the telephone (a public transmission circuit terminal).

According to one aspect of the present invention, in a circuit connecting unit which is connected with a telephone and a data terminal on one side and is connected with a LAN terminal with a speech unit via a LAN on the other side, a speech data interface for interfacing speech data between the telephone and the speech unit of the LAN terminal is provided, and a correlation table for correlating the telephone with the data terminal is provided. Further, a non-speech data interface for interfacing non-speech data between the data terminal and the LAN terminal is provided. In case data from the LAN terminal is speech data, the speech data is transmitted via the speech data interface to the telephone. In case data from the LAN terminal is non-speech data, the non-speech data is transmitted via the non-speech data interface to the data terminal.

In this way, in case the data is speech data, speech between the telephone and the LAN terminal via the speech data interface can be carried out. In case the data is non-speech data, data communication between the data terminal and the LAN terminal correlated with the telephone via the non-speech data interface can be carried out.

With this construction, the speaker on the side of the telephone can use an application function materialized between IT terminals using the data terminal correlated with the telephone as if the speaker were using a LAN terminal. For example, a speaker on the side of a telephone and an operator on the side of a LAN terminal can carry out work such as modification in graphic information or character information referring to the same word processor screen shared by the speaker and the operator.

According to another aspect of the present invention, in the circuit connecting unit mentioned in the above first aspect of the present invention, correlation between the identification number of the telephone and the identification number of the data terminal is used as the correlation table. More specifically, in case the circuit number assigned to the telephone is different from that assigned to the data terminal, by referring to the correlation table, circuit connection between the data terminal and the LAN terminal can be carried out.

According to still another aspect of the present invention, a control means for, in case data from the LAN terminal is speech data, transmitting the speech data via the speech data interface to the telephone, and in case data from the LAN terminal is non-speech data, transmitting the non-speech data via the non-speech data interface to the data terminal comprises an identification means for identifying a selection signal from the telephone. By identifying the selection signal using this identification means, either carrying out only voice communication with the speech unit of the LAN terminal or carrying out data communication also can be selected. Here, the selection signal may be a telephone i number followed by "0#" as a special number.

BRIEF DESCRIPTION OF THE DRAWINGS

FIG. 3 is an explanatory view illustrating a correlation table according to the embodiment of the present invention.

FIG. 4 is an explanatory view illustrating a special number table according to another embodiment of the present invention.

DETAILED DESCRIPTION OF THE PREFERRED EMBODIMENTS

Embodiments of the present invention are now described in the following with reference to the drawings.

Embodiment 1

Figure 1:
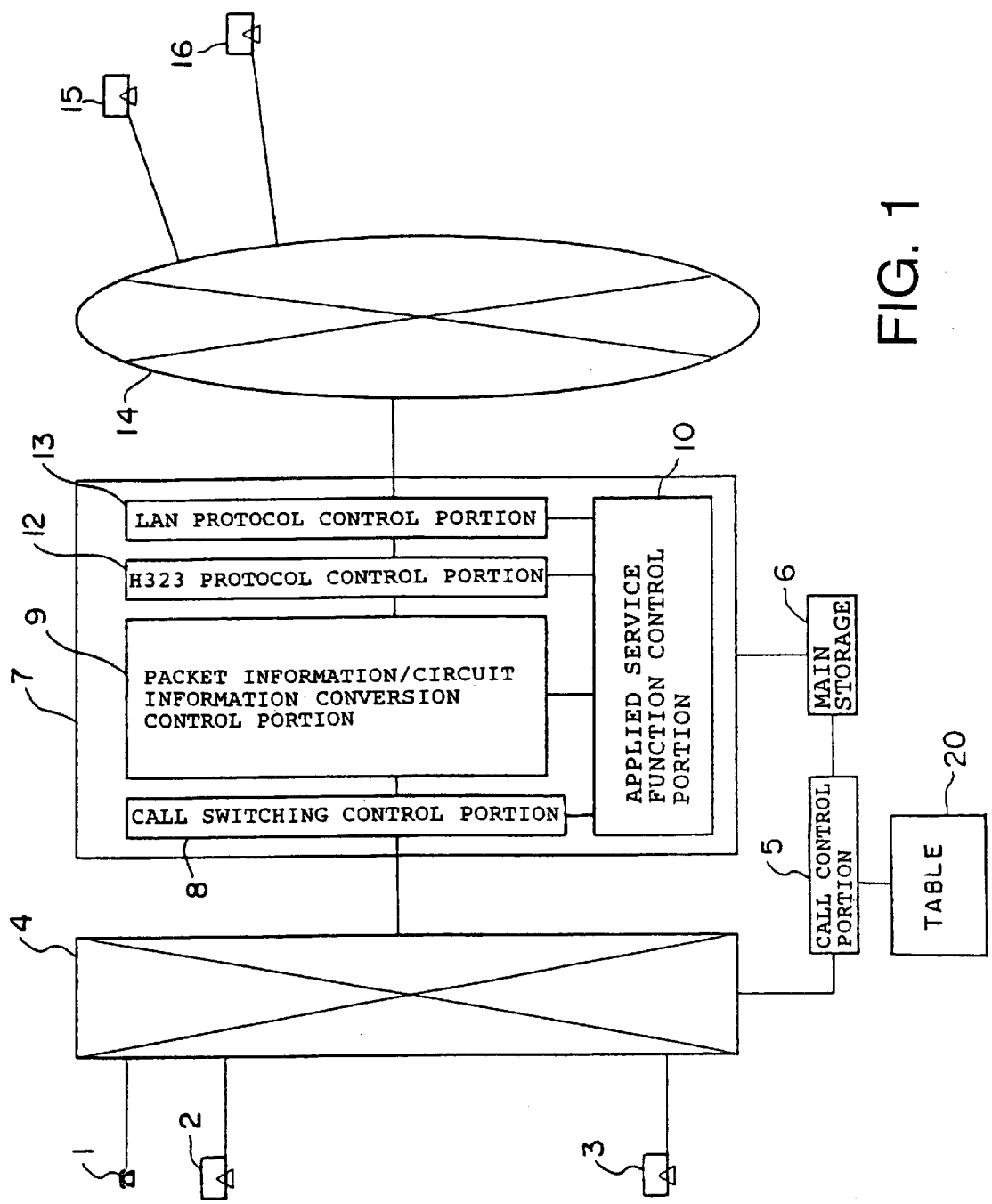
FIG. 1 is a block diagram illustrating the arrangement of a system according to the present invention.

FIG. 1 illustrates the architecture of a system according to the present invention. In FIG. 1, reference numeral 1 denotes a telephone. Reference numerals 2 and 3 denote data terminals each formed of a personal computer. Reference numeral 4 denotes a switching device. Telephone numbers, for example, "2000" and "4000" are assigned to the telephone 1 and the data terminal 2, respectively.

The switching device 4 has a network function portion 7 for connecting with an LAN. The network function portion 7 comprises a call switching control portion 8 for carrying out call switching with the switching device 4, a packet information/circuit information conversion control portion 9 for converting a packet of a LAN and circuit information, an H323 protocol control portion 12, and a LAN protocol control portion 13.

By having these functions, the network function portion 7 can carry out interconnection between a LAN and a public transmission circuit network.

A plurality of LAN terminals 15–18 are connected with a LAN 14. Among them, the LAN terminals 17 and 18 function as application servers to materialize data sharing and chatting among LAN terminals. Though not shown in the figure, the LAN terminals 15 and the like are provided with speech units such as a head-set and a handset, which make it possible for a single terminal to input or output voice data. Therefore, operators (speakers) at the LAN terminals can enjoy conversation with each other via the speech units.

A call control portion 5 has a function to control the switching device 4 and the network function portion 7, and is provided with a correlation table 20. The correlation table 20 may be set on a main storage 6 which is separately connected.

Figure 2:
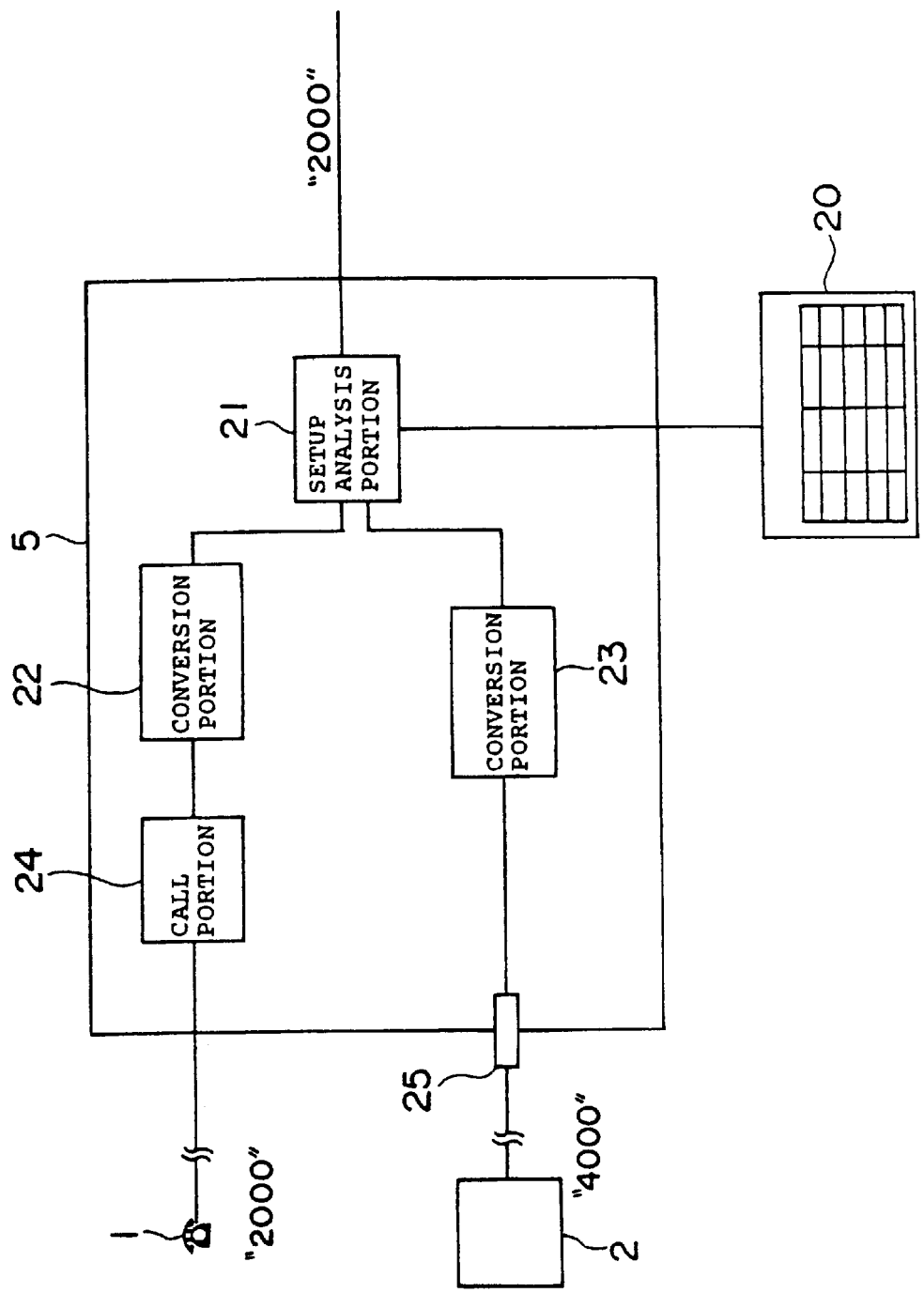
FIG. 2 is a block diagram illustrating the arrangement of functions of a call control portion according to an embodiment of the present invention.

FIG. 2 explains more in detail the functions of the call control portion 5.

In FIG. 2, a SETUP analysis portion 21 has a function to, when a setup message to the telephone number "2000" from the LAN terminal 15 is received, refer to the correlation table 20 and to set simultaneously call to the telephone 1 and to the data terminal 2.

As shown in FIG. 3, telephone numbers as reference keys, whether there is a data terminal associated with the telephone numbers or not, telephone numbers of the associated data terminals, and connecting applications are registered in the correlation table 20.

A connecting application means an application program such as a chat application or a word processor. Though such a program in these application servers runs primarily in communication between LAN terminals, in the present embodiment, with the arrangement shown in FIG. 2, it can be also used between the LAN terminal 15 and the telephone 1 or between the LAN terminal 15 and the data terminal 2.

The SETUP analysis portion 21 analyzes the setup message to the telephone number "2000" from the LAN terminal 15 and refers to the correlation table 20. This allows recognition of the existence of the data terminal associated with the telephone 1 to which the telephone number "2000" is assigned. Further, it is recognized that the telephone number of the data terminal is "4000" and the application to run between the terminals is a chat application.

Then, the SETUP analysis portion 21 calls the telephone 1 through a conversion portion 22 as a speech data interface and a call portion 24 and sets a speech path to the LAN terminal 15.

Simultaneously with the above, the SETUP analysis portion 21 sets a data communication path to the data terminal 2 via a port 25 through a conversion portion 23 as a non-speech data interface.

Here, the SETUP analysis portion 21 starts the chat application registered in the data terminal 2.

As described in the above, the SETUP analysis portion 21 sets separately a speech path and a data communication path with regard to a particular call. By this, speech data from the speech unit of the LAN terminal 15 is transmitted to the telephone 1 via the speech path (the conversion portion 22→the call portion 24), and the application data is transmitted to the data terminal 2 via the data communication path (the conversion portion 23→the port 25). This makes it possible for the speaker at the telephone 1 to enjoy conversation with the operator of the LAN terminal 15 with the speaker operating the data terminal 2, and both the conversation and character data communication using the chat application can be carried out.

Embodiment 2

FIG. 4 illustrates a special number table 20a, which is included in the correlation table 20 in FIGS. 1 and 2.

In the present embodiment, when the SETUP analysis portion 21 refers to the correlation table 20, it also refers to the special number table 20a.

More specifically, even when it is recognized, from the correlation table 20, that the called telephone number is associated with a data terminal, if a special number is not assigned to the called telephone number, a data communication path (the conversion portion 23→the port 25) is not set.

For example, in case the telephone number called by the LAN terminal 15 is only "2000", even if the SETUP analysis portion 21 refers to the correlation table 20, and consequently, recognizes that the data terminal 2 is associated with the telephone number "2000", the SETUP analysis portion 21 only sets the speech path (the conversion portion 22→the call portion 24) and does not set the data communication path (the conversion portion 23→the port 25). In case a special number "0#" is added, that is, the telephone number called by the LAN terminal 15 is "20000#", the SETUP analysis portion 21 refers to both the correlation table 20 and the special number table 20a, and sets simultaneously the speech path (the conversion portion 22→the call portion 24) and the data communication path (the conversion portion 23→the port 25).

According to the present invention, since integrated services materialized between LAN terminals can be also materialized between a LAN terminal and a telephone via a public transmission circuit, services provided by an application server can be expanded, and a flexible call switching system can be constructed.

What is claimed is:

1. A circuit connecting unit connected with a telephone and a data terminal on one side and connected with a LAN terminal with a speech unit via a LAN on the other side in an integrated network comprising:

a speech data interface for interfacing speech data between said telephone and said speech unit of said LAN terminal, a correlation table for correlating said telephone with said data terminal, a non-speech data interface for interfacing non-speech data between said data terminal and said LAN terminal, and a control means for, in case data from said LAN terminal is speech data, interfacing speech with said telephone via said speech data interface, and in case data from said LAN terminal is non-speech data which is sent out to said telephone, referring to said correlation table to specify said data terminal and interfacing data communication with said specified data terminal via said non-speech data interface.

2. A circuit connecting unit in an integrated network as claimed in claim 1, wherein said correlation table correlates the identification number of said telephone with the identification number of said data terminal.

3. A circuit connecting unit as claimed in claim 2, wherein applications to be used in communication are registered in said table and said control means starts an application registered in said table with respect to said data terminal when data communication with said data terminal is carried out.

4. A circuit connecting unit in an integrated network as claimed in claim 1, wherein said control means comprises an identification means for identifying a selection signal from said telephone such that, when said selection signal is received, according to an identifier defined in said selection signal, selects either said speech data interface only to carry out speech with said speech unit of said LAN terminal, or both of said speech data interface and said non-speech data interface to carry out simultaneously with speech data communication between said data terminal specified by said correlation table and said LAN terminal.

5. A circuit connecting unit in an integrated network as claimed in claim 4, wherein said selection signal is a special number added to a telephone number.

* * * * *